US008565107B2

(12) United States Patent
Pease et al.

(10) Patent No.: US 8,565,107 B2
(45) Date of Patent: Oct. 22, 2013

(54) TERMINAL CONFIGURABLE FOR USE WITHIN AN UNKNOWN REGULATORY DOMAIN

(75) Inventors: Michael Pease, Charlotte, NC (US); Christopher Bouchat, Fort Mill, SC (US); Brian Roman Dobeck, Monroe, NC (US); James T. Sauerwein, Jr., Charlotte, NC (US); Eric Youngblood, Charlotte, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 246 days.

(21) Appl. No.: 12/889,907

(22) Filed: Sep. 24, 2010

(65) Prior Publication Data

US 2012/0076045 A1  Mar. 29, 2012

(51) Int. Cl.
H04L 12/28 (2006.01)
H04J 1/16 (2006.01)
(52) U.S. Cl.
USPC ............ 370/252; 370/338; 370/343; 370/430
(58) Field of Classification Search
USPC .................................. 370/252, 338, 343, 430
See application file for complete search history.

(56) References Cited

U.S. PATENT DOCUMENTS

| 5,020,093 A | 5/1991 | Pireh |
| 5,029,183 A | 7/1991 | Tymes |
| 5,142,550 A | 8/1992 | Tymes |
| 5,280,498 A | 1/1994 | Tymes et al. |
| 5,528,621 A | 6/1996 | Heiman et al. |
| 5,557,092 A | 9/1996 | Ackley et al. |
| 5,635,940 A | 6/1997 | Hickman et al. |
| 5,675,137 A | 10/1997 | van Haagen et al. |
| 5,699,408 A | 12/1997 | Krolopp et al. |
| 5,732,349 A | 3/1998 | Sanpei et al. |
| 5,815,811 A | 9/1998 | Pinard et al. |
| 5,857,155 A | 1/1999 | Hill et al. |
| 5,918,159 A | 6/1999 | Fomukong et al. |
| 5,946,634 A | 8/1999 | Korpela |
| 6,002,918 A | 12/1999 | Heiman et al. |
| 6,012,638 A | 1/2000 | Ackley et al. |
| 6,035,212 A | 3/2000 | Rostoker et al. |
| 6,088,591 A | 7/2000 | Trompower et al. |
| 6,091,951 A | 7/2000 | Sturniolo et al. |
| 6,430,554 B1 | 8/2002 | Rothschild |
| 6,484,029 B2 | 11/2002 | Hughes et al. |

(Continued)

FOREIGN PATENT DOCUMENTS

WO  2011162943 A1  12/2011

Primary Examiner — John Pezzlo
(74) Attorney, Agent, or Firm — Heslin Rothenberg Farley & Mesiti P.C.

(57) ABSTRACT

A terminal for use within an unknown regulatory domain, and a computer program product and method for configuring the terminal, are provided. The terminal can comprise first program instructions to actively scan one or more domain independent channels in a frequency band, second program instructions to configure the terminal for use in the unknown regulatory domain in response to the terminal receiving regulatory domain information as a result of actively scanning one or more of the domain independent channels, third program instructions to passively scan one or more domain dependent channels in the frequency band in response to the terminal not receiving the regulatory domain information as a result of actively scanning one or more of the domain independent channels, and fourth program instructions to configure the terminal for use in the unknown regulatory domain in response to passively scanning one or more domain dependent channels in the frequency band.

24 Claims, 9 Drawing Sheets

(56) References Cited

U.S. PATENT DOCUMENTS

| | | |
|---|---|---|
| 6,597,465 B1 | 7/2003 | Jarchow et al. |
| 6,651,053 B1 | 11/2003 | Rothschild |
| 7,199,719 B2 | 4/2007 | Steinberg |
| 7,260,395 B1 | 8/2007 | Hughes et al. |
| 7,583,178 B2 | 9/2009 | Hougen et al. |
| 7,619,524 B2 | 11/2009 | Calvarese |
| 7,654,454 B2 | 2/2010 | Silverbrook et al. |
| 7,738,865 B2 | 6/2010 | Hughes et al. |
| 8,036,153 B2 | 10/2011 | Green |
| 8,155,018 B2 | 4/2012 | Green et al. |
| 2003/0216969 A1 | 11/2003 | Bauer et al. |
| 2004/0047324 A1* | 3/2004 | Diener ............ 370/338 |
| 2004/0118916 A1 | 6/2004 | He |
| 2004/0127240 A1* | 7/2004 | Li ............ 455/500 |
| 2005/0109844 A1 | 5/2005 | Hilliard |
| 2005/0258252 A1 | 11/2005 | Winter et al. |
| 2006/0019660 A1* | 1/2006 | Li ............ 455/434 |
| 2006/0023686 A1* | 2/2006 | Jeong et al. ............ 370/338 |
| 2007/0237121 A1* | 10/2007 | Khandelwal et al. ......... 370/338 |
| 2008/0028062 A1 | 1/2008 | Tschumper et al. |
| 2008/0096501 A1* | 4/2008 | Salomone et al. ......... 455/161.1 |
| 2008/0259882 A1* | 10/2008 | Abdel-Kader et al. ....... 370/338 |
| 2008/0309494 A1 | 12/2008 | Bahar |
| 2009/0224045 A1 | 9/2009 | Toda et al. |
| 2009/0273449 A1 | 11/2009 | Tuttle |
| 2009/0315685 A1 | 12/2009 | Bauchot et al. |
| 2010/0019882 A1 | 1/2010 | Stern et al. |
| 2010/0117798 A1 | 5/2010 | Jenkins et al. |
| 2010/0148930 A1 | 6/2010 | Silverbrook et al. |
| 2013/0142187 A1* | 6/2013 | Gong ............ 370/338 |

\* cited by examiner

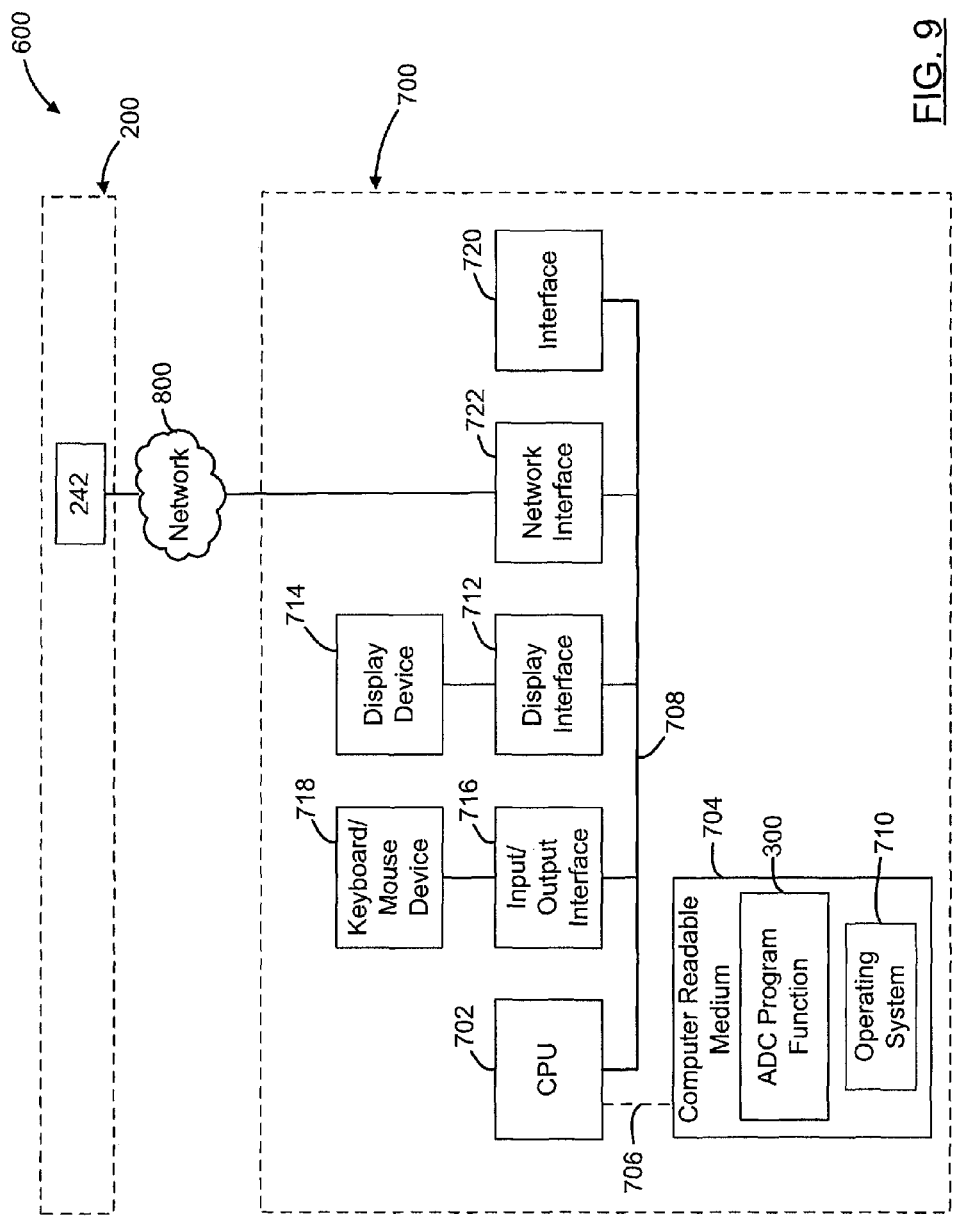

TERMINAL CONFIGURABLE FOR USE WITHIN AN UNKNOWN REGULATORY DOMAIN

FIELD OF THE INVENTION

This invention relates generally to the field of terminals, and more particularly to terminals having wireless local area network (WLAN) interfaces.

BACKGROUND OF THE INVENTION

Many WLAN systems implement IEEE 802.11, which is a family of standards offered by The Institute of Electrical and Electronics Engineers (IEEE). The IEEE standards specify the radio interface between access points and terminals and also between terminals. Currently, 802.11a, 802.11b, and 802.11g standards are widely used. Each 802.11 standard specifies a specific frequency band (e.g., 2.4 GHz for 802.11b/g communications and 5 GHz for 802.11a communications) at which access points and terminals can send and receive transmissions. Each frequency band is divided into channels. For example, the 802.11b and 802.11g standards define fourteen channels within the 2.4 GHz frequency band, as shown in the following Table 1.

TABLE 1

| Channel | Center Frequency (in MHz) | Americas | EMEA | Japan |
| --- | --- | --- | --- | --- |
| 1 | 2412 | X | X | X |
| 2 | 2417 | X | X | X |
| 3 | 2422 | X | X | X |
| 4 | 2427 | X | X | X |
| 5 | 2432 | X | X | X |
| 6 | 2437 | X | X | X |
| 7 | 2442 | X | X | X |
| 8 | 2447 | X | X | X |
| 9 | 2452 | X | X | X |
| 10 | 2457 | X | X | X |
| 11 | 2462 | X | X | X |
| 12 | 2467 | — | X | X |
| 13 | 2472 | — | X | X |
| 14 | 2484 | — | — | X |

The use of certain channels by access points and terminals can be restricted in a geographic area by an applicable regulatory domain. For example, as shown in Table 1, the use of channels 12, 13, 14 is permitted (as denoted by the character "X") in Japan by the Telecom Engineering Center (TELEC) regulatory domain, but is prohibited (as denoted by the character "—") in countries in North, South, and Central America (the "Americas") by the North American (FCC) regulatory domain. The use of channels 12 and 13 is permitted in countries in Europe, the Middle East, Africa, and various parts of Asia ("EMEA") by the European Telecommunications Standards Institute (ETSI) regulatory domain, but the ETIS regulatory domain prohibits the use of channel 14 in EMEA.

Similarly, the IEEE 802.11a standard also defines channels within the 5 GHz frequency band, the use of which is also regulated differently by the TELEC regulatory domain, the North American regulatory domain, and the ETSI regulatory domain, as shown in the following Table 2.

TABLE 2

| Channel | Center frequency (in MHz) | Americas | EMEA | Japan |
| --- | --- | --- | --- | --- |
| 34 | 5170 | — | — | X |
| 36 | 5180 | X | X | — |
| 38 | 5190 | — | — | X |
| 40 | 5200 | X | X | — |
| 42 | 5210 | — | — | X |
| 44 | 5220 | X | X | — |
| 46 | 5230 | — | — | X |
| 48 | 5240 | X | X | — |
| 52 | 5260 | X | X | — |
| 56 | 5280 | X | X | — |
| 60 | 5300 | X | X | — |
| 64 | 5320 | X | X | — |
| 100 | 5500 | — | X | — |
| 104 | 5520 | — | X | — |
| 108 | 5540 | — | X | — |
| 112 | 5560 | — | X | — |
| 116 | 5580 | — | X | — |
| 120 | 5600 | — | X | — |
| 124 | 5620 | — | X | — |
| 128 | 5640 | — | X | — |
| 132 | 5660 | — | X | — |
| 136 | 5680 | — | X | — |
| 140 | 5700 | — | X | — |
| 149 | 5745 | X | — | — |
| 153 | 5765 | X | — | — |
| 157 | 5785 | X | — | — |
| 161 | 5805 | X | — | — |

Regulatory domains also regulate the maximum transmission power allowed per antenna gain. Antenna gain relates the intensity of an antenna in a given direction to the intensity that would be produced by a hypothetical ideal antenna that radiates equally in all directions, isotropically, and has no losses. Table 3 depicts maximum power levels per antenna gain in accordance with the 802.11g standard and as regulated by the TELEC regulatory domain, the North American regulatory domain, and the ETSI regulatory domain.

TABLE 3

| Antenna Gain (dBi) | Americas - Max Power Level (mW) - CCK | Americas - Max Power Level (mW) - OFDM | EMEA - Max Power Level (mW) - CCK | EMEA - Max Power Level (mW) - OFDM | Japan - Max Power Level (mW) - CCK | Japan - Max Power Level (mW) - OFDM |
| --- | --- | --- | --- | --- | --- | --- |
| 2.2 | 100 | 30 | 50 | 30 | 5 | 5 |
| 6 | 100 | 30 | 30 | 10 | 5 | 5 |
| 6.5 | 100 | 30 | 20 | 10 | 5 | 5 |
| 10 | 100 | 30 | 10 | 5 | 5 | 5 |
| 13.5 | 100 | 30 | 5 | 5 | 5 | 5 |
| 15 | 50 | 20 | 5 | 1 | 5 | 5 |
| 21 | 20 | 10 | 1 | — | 5 | 5 |

A terminal operating in a regulatory domain over permitted channels and maximum transmission powers can use two types of scanning to search for an access point of a WLAN with which to associate. In passive scanning, the terminal generally listens for beacon frames broadcast by access points, one channel at a time. The beacon frames include the service set identifier (SSID) of the WLAN being hosted by the access point. Since beacon frames are often broadcast at regular intervals of approximately 100 ms, the terminal typically has to "dwell" for about 105 milliseconds (ms) on a first channel before trying a second channel. The lack of a beacon frame over the first channel can mean either that there are no access points broadcasting on the first channel or that the first channel is outside of the legal frequency band of the regulatory domain. By listening to all channels that are used in the WLAN via passive scanning, the terminal can collect all the information on channels that are currently supported by access points and within the legal frequency band of the regulatory domain.

By contrast, in active scanning, the terminal transmits an active probe request on a channel. The terminal may receive one or more probe responses from access points. The probe responses may be received within 15 ms of the transmission of the active probe request, thereby making active scanning relatively faster than passive scanning. If no probe response is received in that time, there are either no access points on that channel, or the channel is outside of the legal frequency band of the regulatory domain. The terminal may then try a different channel.

SUMMARY OF THE INVENTION

There is provided a terminal for use within an unknown regulatory domain. The terminal can comprise first program instructions to actively scan one or more domain independent channels in a frequency band, second program instructions to configure the terminal for use in the unknown regulatory domain in response to the terminal receiving regulatory domain information as a result of actively scanning one or more of the domain independent channels, third program instructions to passively scan one or more domain dependent channels in the frequency band in response to the terminal not receiving the regulatory domain information as a result of actively scanning one or more of the domain independent channels, and fourth program instructions to configure the terminal for use in the unknown regulatory domain in response to passively scanning one or more domain dependent channels in the frequency band.

BRIEF DESCRIPTION OF THE DRAWINGS

So that the manner in which the above recited features of the present invention can be understood in detail, a more particular description of the invention briefly summarized above, may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Moreover, the drawings are not necessarily to scale, emphasis generally being placed upon illustrating the principles of certain embodiments of invention.

Thus, for further understanding of the concepts of the invention, reference can be made to the following detailed description, read in connection with the drawings in which:

FIG. 9 is a block diagram of a system for deploying a program function to a terminal according to an exemplary embodiment of the invention.

DETAILED DESCRIPTION OF THE INVENTION

Prior to the introduction of the IEEE 802.11d standard, terminals were typically configured for use in a single regulatory domain at the time of manufacture. Because the regulatory domain could not be changed, the terminal could not be used in a regulatory domain other than the original one for which it was manufactured. However, the 802.11d standard introduced a mechanism that allows terminals compatible with the standard to be able to operate in more than one regulatory domain over time. The 802.11d standard proposes that an access point transmit a country information element in a conventional format within its beacon frames and probe responses. The country information element contains the information required to allow a terminal to identify the regulatory domain in which it is located and to configure the physical layer of its WLAN interface for operation in that regulatory domain.

Figure 1:
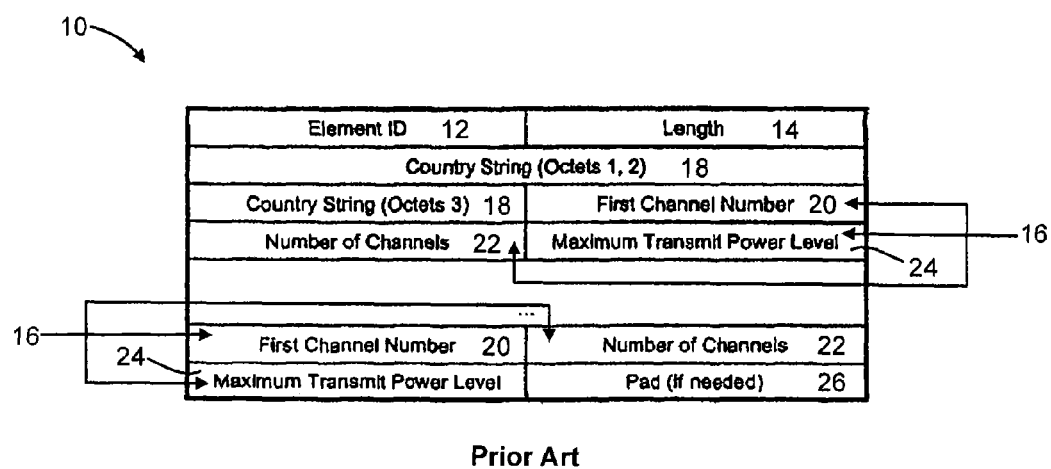
FIG. 1 shows an example of a conventional format for providing domain information to a terminal.

FIG. 1 shows an example of a conventional format for providing regulatory domain information to a terminal. Country information element 10 comprises an element identifier 12 that indicates that the information presented in country information element 10 is related to regulatory domain information. The length 14 of country information element 10 is variable, as country information element 10 may contain more than one triplet 16. A country string 18 contains a three octet International Organization of Standardization (ISO) country code for the name of the country within the regulatory domain in which the access point transmitting country information element 10 is located. Each country name in English as given in ISO 3166-1 has a corresponding ISO 3166-1-alpha-2 code element. For example, the code elements for Canada, the United States of America, and Japan are CA, US, and JP, respectively. Each triplet 16 can comprise a first channel number 20, a number of channels 22, and a maximum transmit power level 24. First channel number 20 indicates the lowest channel number in the sub-band described in country information element 10. Number of channels 22 indicates the number of channels in the sub-band. The group of channels described by each pair of first channel number 20 and number of channels 22 can not overlap and is monotonically increasing in channel numbers. Maximum transmit power level 24 indicates the maximum power, in dBm, allowed to be transmitted for the sub-band. Pad field 26 is for padding and has zero or one octets in length.

According to the 802.11d standard, a terminal that is enabled for operation across regulatory domains defaults to passive scanning when it has lost connectivity with its extended service set (ESS). Passive scanning is performed using only the receiving capabilities of wireless stations, so there is no risk of violating the regulations of any regulatory domain (which can result in a product ban or other import/ financial penalties). By contrast, since active scanning involves the terminal's transmission of a probe frame, it may violate the regulations of the regulatory domain in which the terminal is located. For example, the channel over which the probe frame was transmitted may not be within the legal frequency band of the regulatory domain, or the transmission power of the probe frame may exceed the regulated maximum transmission power of the regulatory domain. Upon losing connectivity with its ESS, a terminal compatible with the 802.11d standard passively scans to learn at least one valid channel, i.e., a channel upon which it detects IEEE 802.11 beacon frames. Once the terminal has acquired the information so that it is able to meet the transmit requirements of the regulatory domain, it transmits a probe request to an access point to gain the additional regulatory information contained in the probe response frame, unless the information was previously received in a beacon frame. The terminal then has sufficient information available for operation in the regulatory domain.

It was determined in the course of developing the apparatuses and methods provided herein that, while guaranteeing safety by using passive scan whenever a wireless station has lost connection with its access point and also reducing scanning time by using active scan after the regulatory information becomes available, IEEE 802.11d has a number of disadvantages. For example, scanning time for terminals staying within a regulatory domain is still long. In order to avoid possible regulation violations due to regulatory domain changes, IEEE 802.11d uses passive scan until valid domain information is obtained. However, the scanning time of a passive scan in the beginning is still significant for a terminal that moves around but stays within a regulatory domain. Although the scanning time for IEEE 802.11d is better on the average than in the all-passive scan case, the worst case performance of IEEE 802.11d may be similar to the all-passive scan case.

Suppose a terminal is connected to an access point having N channels via Channel 1. After the terminal has lost a connection with the access point, it tries to find a new channel Assuming that Channel N is the only channel available around the terminal and that the channel scanning happens to be in increasing order of channel number, then the scanning time would be as much as (N−1) times as long as the beacon interval, which is the same as in the case of an all-passive scan. Considering the number of terminals staying within a regulatory domain is likely much larger than the terminals crossing the regulatory domain boundary, it can be undesirable to sacrifice scanning speed for domain-aware roaming capability.

Embodiments of the invention address the disadvantages of IEEE 802.11d set forth hereinabove. In one exemplary embodiment of the invention, a terminal for use within an unknown regulatory domain is provided. The terminal can comprise one or more processors, one or more computer readable storage mediums, a wireless local area network (WLAN) interface comprising a radio, the radio being operative in a frequency band, first program instructions to actively scan one or more domain independent channels in the frequency band, second program instructions to configure the terminal for use in the unknown regulatory domain in response to the terminal receiving regulatory domain information as a result of actively scanning one or more of the domain independent channels, third program instructions to passively scan one or more domain dependent channels in the frequency band in response to the terminal not receiving the regulatory domain information as a result of actively scanning one or more of the domain independent channels, and fourth program instructions to configure the terminal for use in the unknown regulatory domain in response to passively scanning one or more domain dependent channels in the frequency band. The first, second, third, and fourth program instructions can be stored on the one or more computer readable storage mediums for execution by the one or more processors.

Contrary to 802.11d, a terminal according to exemplary embodiments of the invention first utilizes active scanning of domain independent channels in an attempt to receive a probe response comprising regulatory domain information before resorting to passively scanning domain dependent channels. Actively scanning domain independent channels ensures that the terminal operates in the legal frequency band of all regulatory domains. Actively scanning domain independent channels can also advantageously increase scanning speed over that provided in accordance with 802.11d, as probe responses from access points may be received within 15 ms of the transmission of an active probe request sent during active scanning, while beacon frames from access points may be received from access points every 100 ms during passive scanning.

Figure 2:
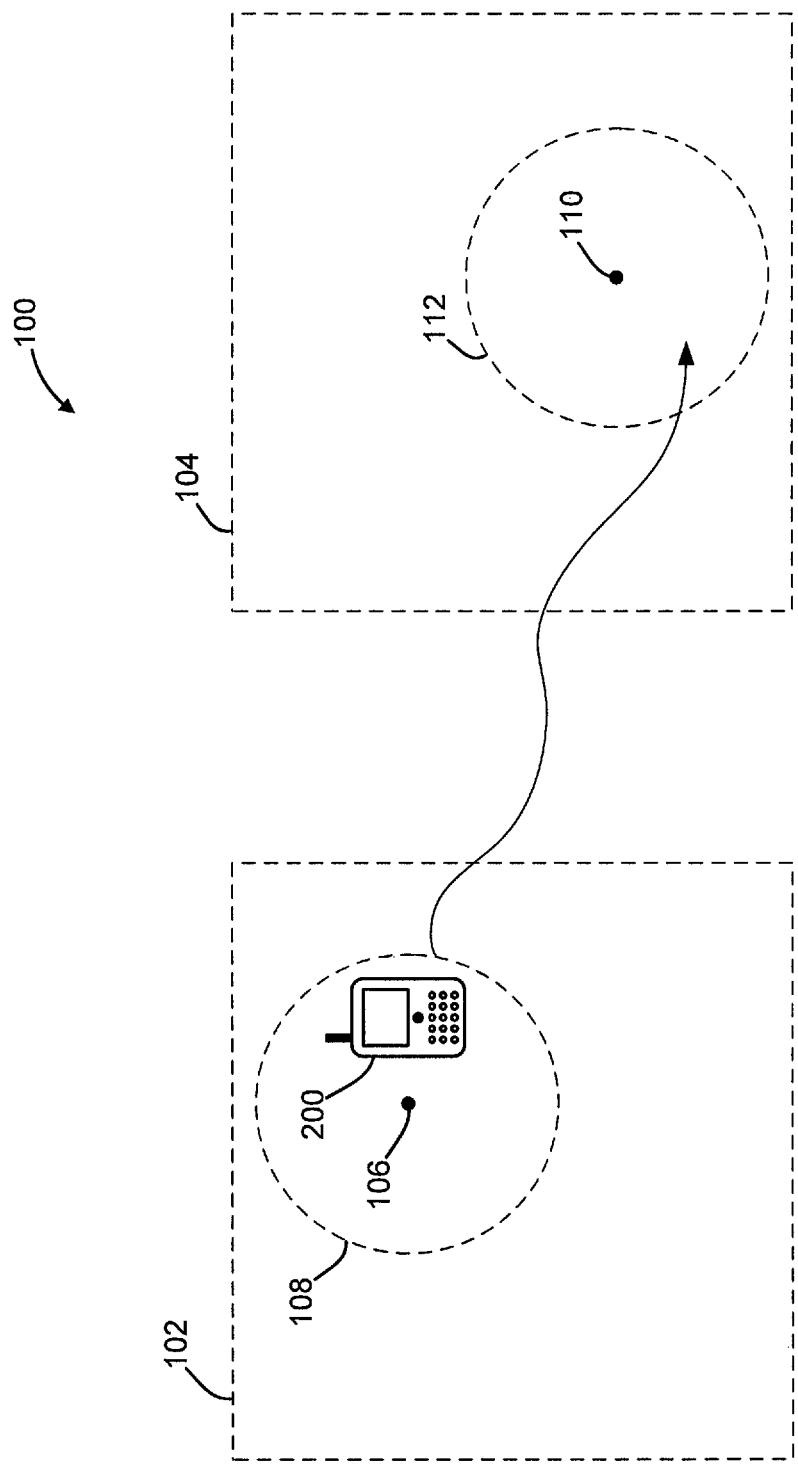
FIG. 2 illustrates an exemplary communications environment.

FIG. 2 is an illustration of an exemplary communications environment 100. FIG. 2 shows two different regulatory domains 102 and 104 for WLAN communications. Access point 106 has coverage area 108 and is located in regulatory domain 102. Access point 110 has coverage area 112 and is located in regulatory domain 104. A terminal 200 in accordance with exemplary embodiments of the invention can have adaptive domain compliance (ADC) program function 300 (shown in FIG. 3) to configure itself for use within coverage area 108 of regulatory domain 102, when within coverage area 108 of regulatory domain 102, and for use within coverage area 112 of regulatory domain 104, when within coverage area 112 of regulatory domain 104.

Figure 3:
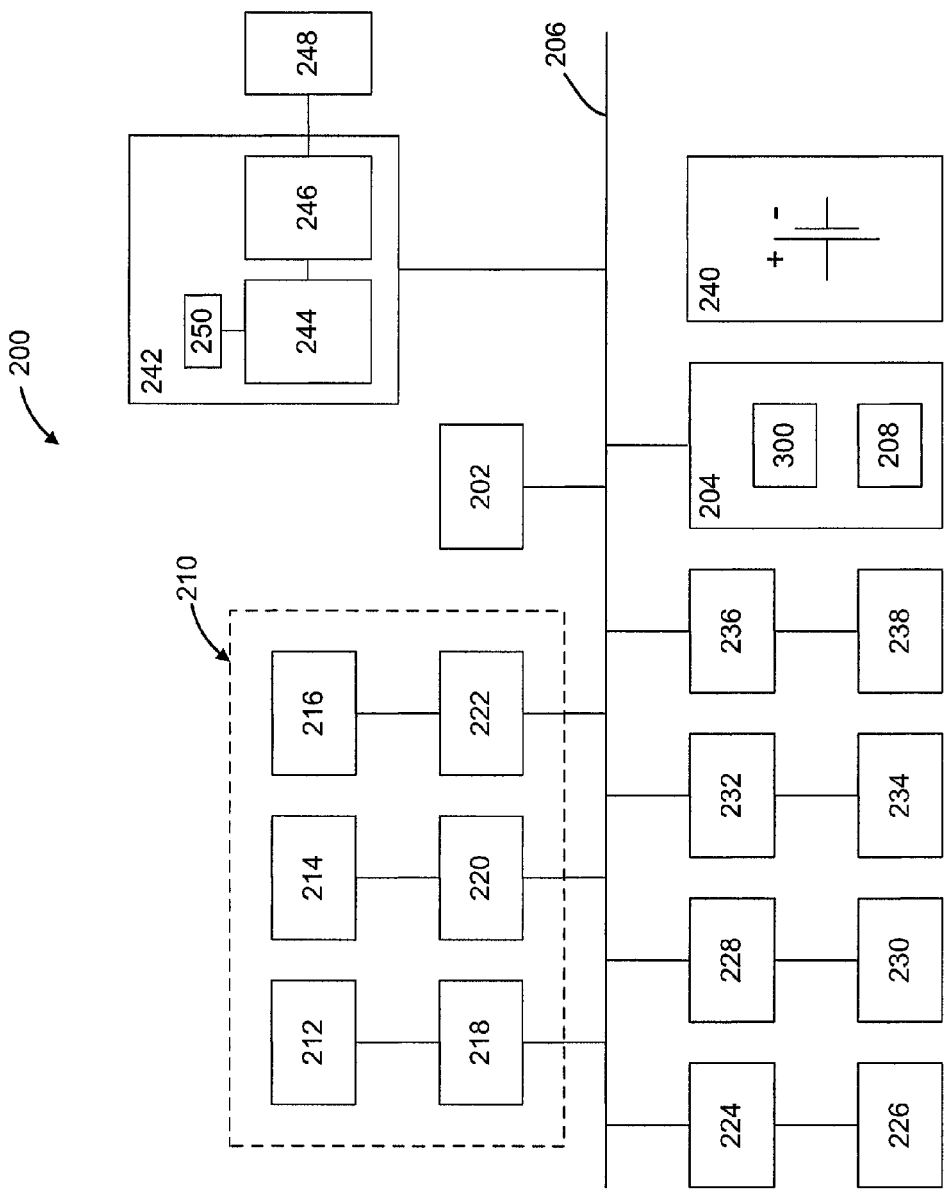
FIG. 3 illustrates a component diagram of a terminal according to an exemplary embodiment of the invention.

FIG. 3 is a block diagram of terminal 200 according to one exemplary embodiment of the invention. Terminal 200 can comprise a processor provided by central processing unit (CPU) 202 and a computer readable medium 204, both coupled to a system bus 206. CPU 202 can be provided by a general purpose microprocessor. Computer readable medium 204 can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Collective regulatory domain data 208 and ADC program function 300 can be stored on computer readable medium 204. Collective regulatory domain data 208 can include, for each regulatory domain, a record of restricted and unrestricted channels in one or more frequency bands specified in an IEEE 802.11 standard and the corresponding maximum transmission powers allowed per antenna gain, e.g., the contents of Tables 1, 2, and 3 hereinabove. ADC program function 300 can be computer program code comprising a computer program product for configuring terminal 200 for use within an unknown regulatory domain and can be embodied on computer readable medium 204. ADC program function 300 can be transmitted using any appropriate medium, including but not limited to wireless, wireline, optical fiber cable, RF, etc., or any suitable combination of the foregoing. ADC program function 300 can include program instructions written in any combination of one or more programming languages, including an object oriented programming language such as Java, Smalltalk, C++ or the like, conventional procedural programming languages, such as the "C" programming language, low-level programming languages, such as assembly language, or other high- or low-level programming languages. ADC program function 300 can utilize collective regulatory domain data 208.

Terminal 200 can further comprise an encoded information reading (EIR) device 210. EIR device 210 can comprise a bar code reading device 212, an RFID reading device 214, and a card reading device 216. Bar code reading device 212 can be provided by an IT4XXX/5XXX Imaging Module with decode out circuit of the type available from Hand Held Products, Inc. of Skaneateles Falls, N.Y. The IT4XXX/5XXX Imaging Module with decode out circuit provides decoding of a plurality of different types of bar code symbols and other decodable symbols such as PDF 417, Micro PDF 417, Maxi-Code, Data Matrix, QR Code, Aztec, Aztec Mesa, Code 49, UCC Composite, Snowflake, Data Gliffs, Code 39, Code 128, Codabar, UPC, EAN, Interleaved 205, RSS, Code 93, Codablock, BC412, Postnet, Planet Code, Japanese Post, KIX (Dutch Post), OCR A and OCR B. RFID reading device 214 can be provided by a Skytek Sky Module M1 reading terminal. Card reading device 216 can include an integrated circuit card (IC CARD) reading terminal device, otherwise known as a smart card reader. Bar code reading device 212, RFID reading device 214, and card reading device 216 can be coupled to system bus 206 via interface circuits 218, 220, and 222, respectively. In one embodiment, EIR device 210 can output decoded message data, e.g., decoded bar code message data, decoded RFID message data, decoded mag stripe message data, and/or decoded smart card message data, corresponding to an encoded message. In another embodiment, EIR device 210 can output raw message data containing an encoded message, e.g., raw image data or raw RFID data, to be processed by CPU 202.

Terminal 200 can include various interface circuits for coupling various peripheral devices to system bus 206 for communication with a processor provided by CPU 202. Terminal 200 can include interface circuit 224 for coupling trigger 226 to system bus 206, interface circuit 228 for coupling display 230 to system bus 206, interface circuit 232 for coupling pointer mechanism 234 to system bus 206, and interface circuit 236 for coupling keyboard 238 to system bus 206. Trigger 226 can be used to make active a trigger signal for activating frame readout and/or certain decoding processes to decode decodable indicia read by EIR device 210. Terminal 200 can also include a battery 240.

Terminal 200 can further include WLAN interface 242. WLAN interface 242 can be compatible with one or more standards of the family of IEEE 802.11 wireless communication standards. WLAN interface 242 can comprise a Media Access Control (MAC) and a baseband (BB) processor 244 and a radio 246. MAC/BB processor 244 can be coupled to radio 246, which radio 246 can be operative in a frequency band, e.g., 2.4 GHz or 5 GHz. An antenna 248 can be coupled to radio 246. MAC/BB processor 244 can also be coupled to a computer readable medium 250 for storing a value indicative of country string 18, an indication of one of triplets 16, or other regulatory parameters. In one exemplary embodiment of the invention, ADC program function 300 can be a driver for MAC/BB processor 244 and can advantageously be devoid of an application program interface or user interface through which the value set in computer readable medium 250 can be incorrectly changed, e.g., to a country string of a country that is not within the regulatory domain in which terminal 200 is located.

Figures 4A, 4B:
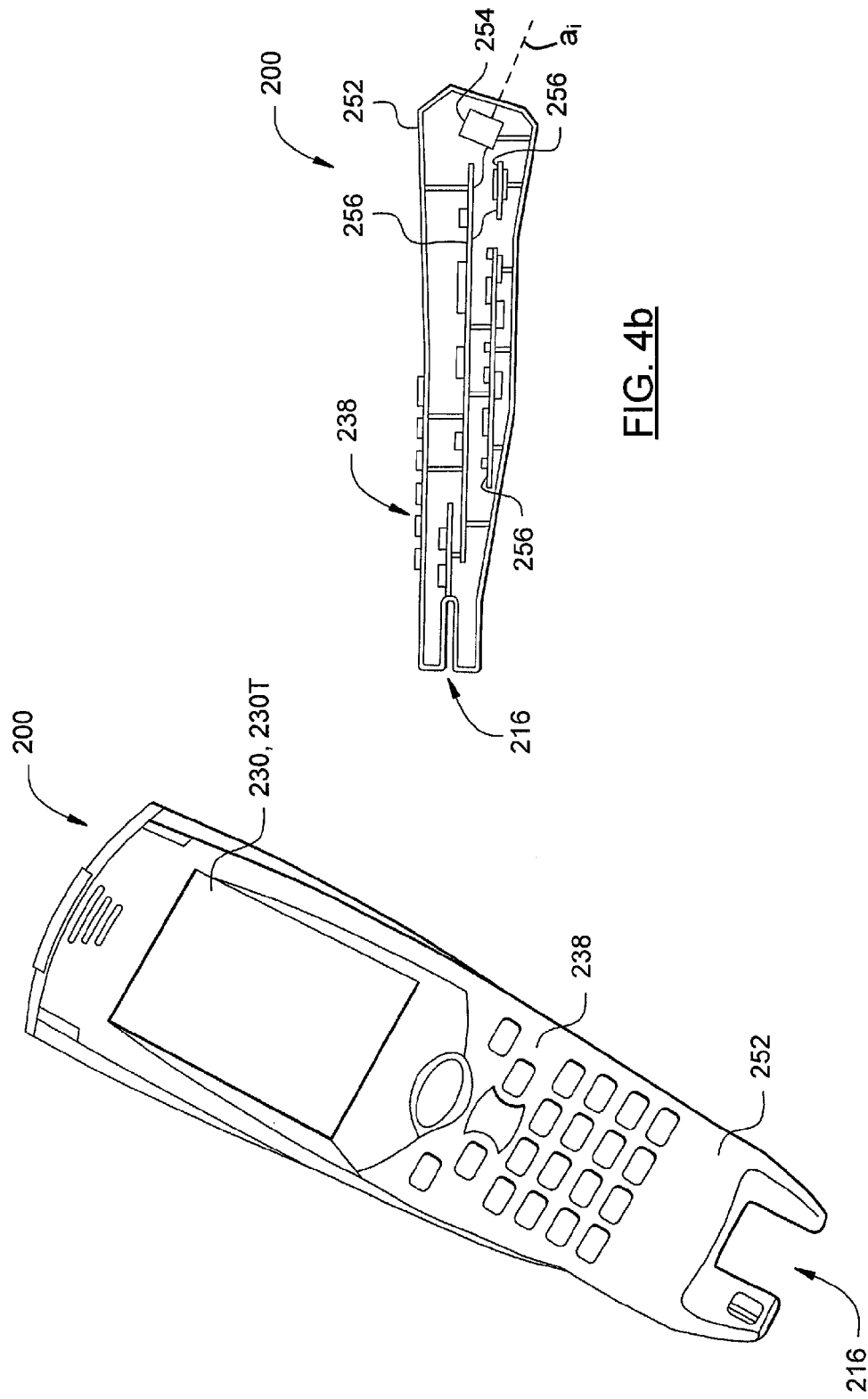
FIGS. 4a and 4b illustrate an exemplary hand held terminal housing.

FIGS. 4a-4b are illustrations of a form factor and housing for terminal 200 according to one exemplary embodiment of the invention. As indicated by the exemplary embodiment of FIGS. 4a-4b, the components of FIG. 3 can be incorporated into a hand held housing 252. Terminal 200 of FIGS. 4a-4b is in the form factor of a hand held portable data terminal. Terminal 200 as shown in FIGS. 4a-4b includes keyboard 238, display 230 having an associated touch screen 230T, card reading device 216, and an imaging module 254, which includes an image sensor array incorporated on an image sensor integrated circuit (IC) chip. Imaging module 254 has an associated imaging axis, $a_i$. As indicated by the side view of FIG. 4b, the components of the block diagram of FIG. 3 may be supported within housing 252 on a plurality of circuit boards 256. Imaging module 254 may include an image sensor array having color sensitive pixels as described in Provisional Patent Application Nos. 60/68,606, filed Jun. 3, 2005, 60/690/268. filed Jun. 14, 2005, 60/692,890, filed Jun. 22, 2005, and 60/694,371, filed Jun. 27, 2005, all of which are entitled Digital Picture Taking Optical Reader Having Hybrid Monochrome And Color Image sensor, and all of which are incorporated herein by reference.

Figure 5:
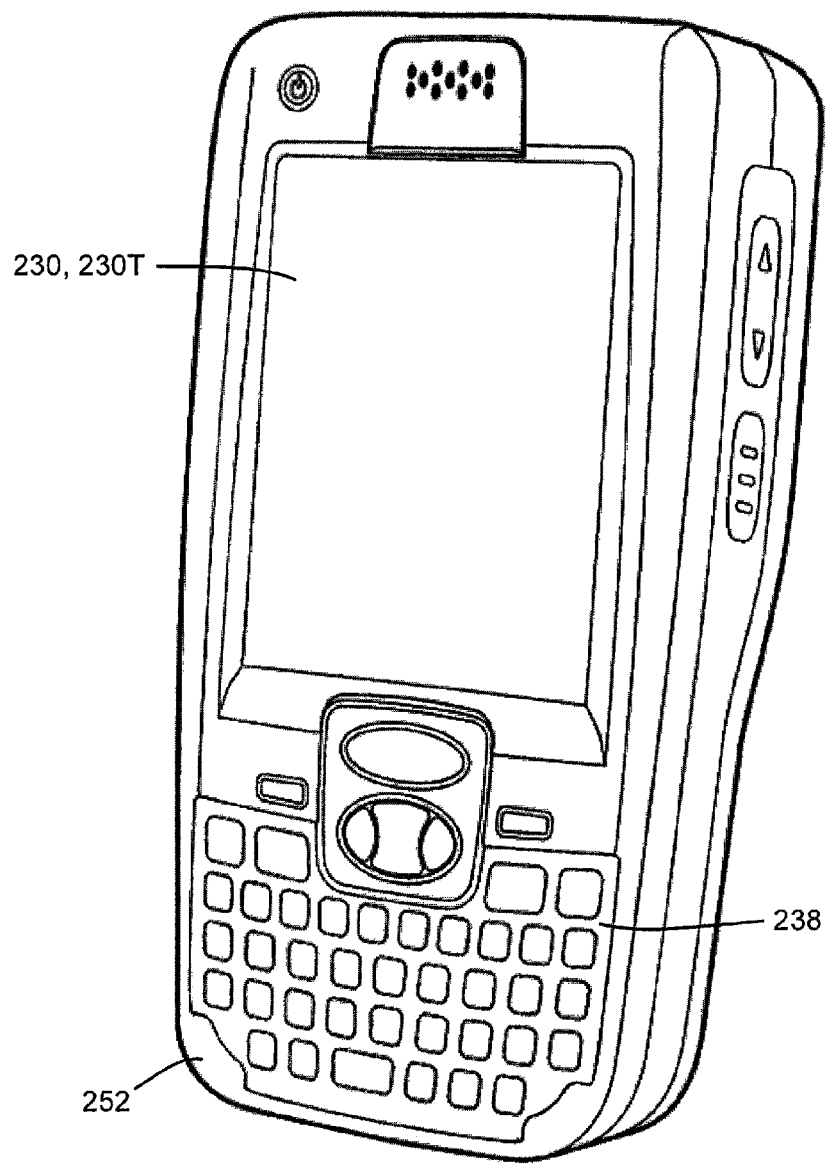
FIG. 5 is a perspective view of a form factor and housing for terminal according to an exemplary embodiment of the invention.

FIG. 5 is a perspective view of a form factor and housing for terminal 200 according to another exemplary embodiment of the invention. As indicated by the exemplary embodiment of FIG. 5, the components of FIG. 3 can be incorporated into a hand held housing 252. Terminal 200 of FIG. 5 is in the form factor of a hand held portable data terminal. Terminal 200 as shown in FIG. 5b includes keyboard 238 and display 230 having an associated touch screen 230T.

Figure 6A:
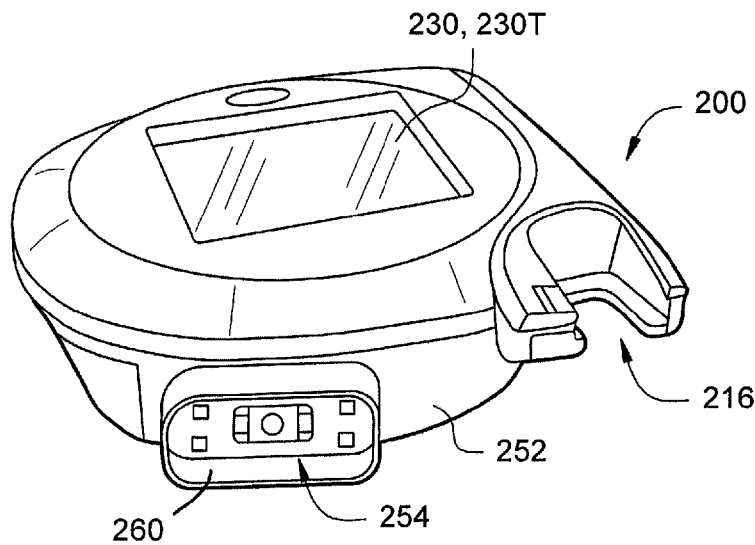
FIGS. 6a-6c illustrate an exemplary portable and remountable terminal housing.
Figure 6B:
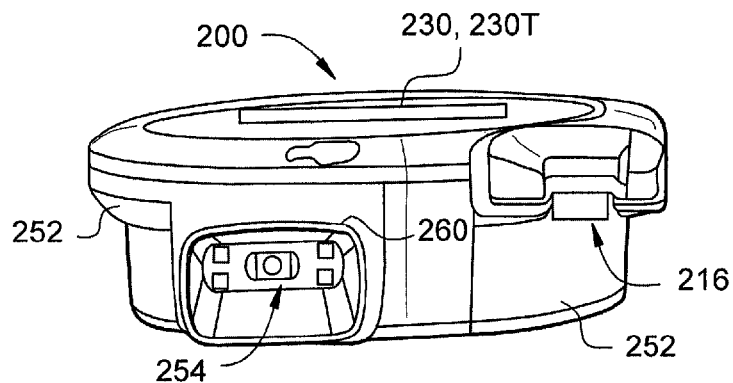
Figure 6C:
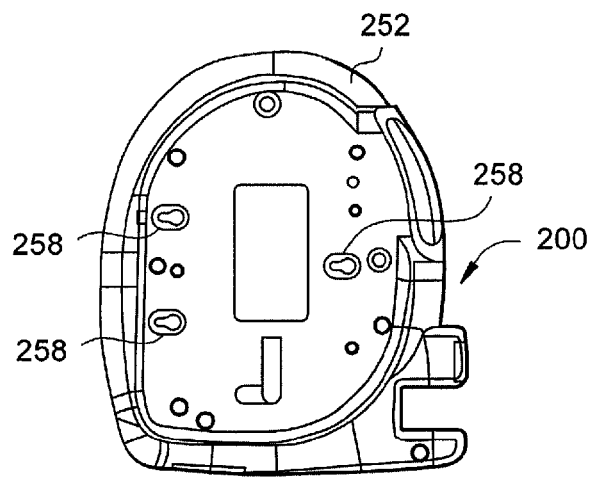

In the exemplary embodiment of FIGS. 6a-6c, terminal 200 is in the form of a transaction terminal that may be configured as a retail purchase transaction terminal or as a price verifier. Housing 252 of the transaction terminal shown in FIGS. 6a-6c is configured to be portable so that it can be moved from location to location and is further configured to be replaceably mounted on a fixed structure such as a fixed structure of a cashier station or a fixed structure of a retail store floor (e.g., a shelf or a column 400 best viewed in FIG. 7b). Referring to the bottom view of FIG. 6c, housing 252 of terminal 200 has formations 258 facilitating the replaceable mounting of terminal 200 on a fixed structure. Referring now to FIG. 6b, terminal 200 includes display 230 and associated touch screen 230T, card reading device 216, imaging module 254, and a luminous shroud 260. When light from an illumination block (not shown in FIG. 3) strikes luminous shroud 260, the shroud glows to attract attention to the location of the imaging assembly. In certain operating modes as indicated in FIG. 7c, terminal 200 in accordance with any of FIGS. 6a-6c displays on display 230 a PIN entry screen prompting a customer to enter pin information into touch screen 230T. In other operating modes, as indicated in FIG. 7, terminal 200 displays on display 230 a signature prompt screen prompting a customer to enter signature information into the device with use of a stylus 262.

Figure 7A:
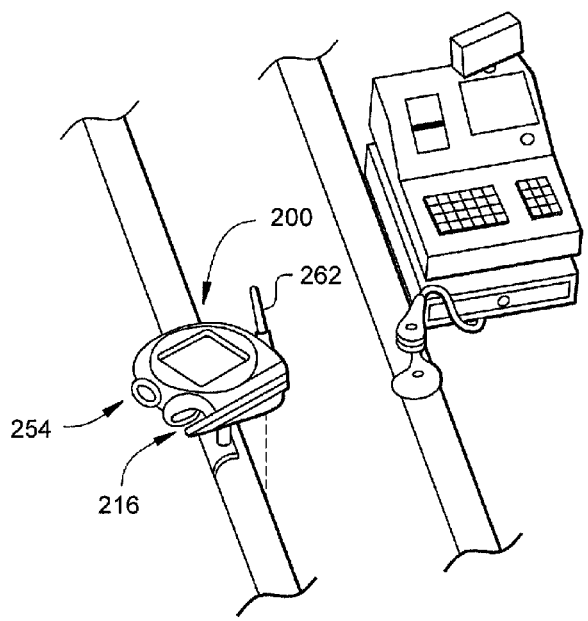
FIG. 7a illustrates a first exemplary deployment of a terminal according to an exemplary embodiment of the invention within a retail store.
Figure 7B:
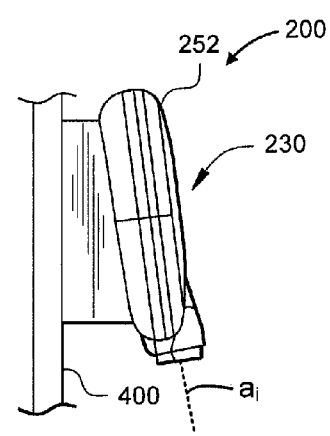
FIG. 7b illustrates a second exemplary deployment of a terminal according to an exemplary embodiment of the invention within a retail store.
Figure 7C:
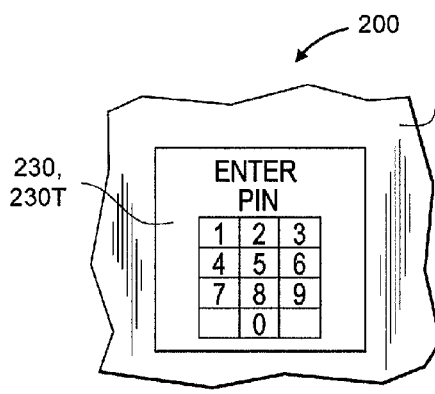
FIGS. 7c-7d illustrate PIN and signature data entry operational modes of an encoded information reading terminal according to an exemplary embodiment of the invention.
Figure 7D:
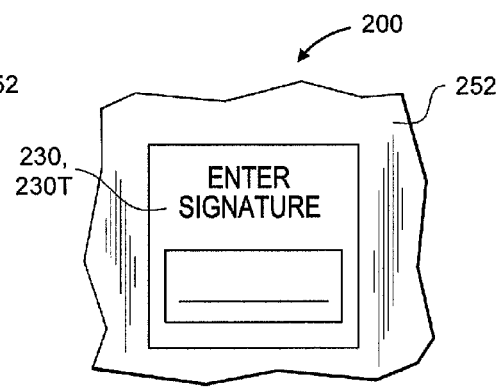

Referring to FIGS. 7a and 7b, various installation configurations for the terminal of FIGS. 6a-6c are shown. In the view of FIG. 7a, terminal 200 is installed as a retail purchase transaction terminal at a point of sale cashier station. In the setup of FIG. 7a, terminal 200 is configured as a retail purchase transaction terminal and is utilized to aid and facilitate retail transactions at a point of sale. A customer may enter a credit card or debit card into card reading device 216 and the retail purchase transaction terminal may transmit the credit or debit card information to a credit/debit authorization network.

In the view of FIG. 7b, terminal 200 is configured as a price verifier to aid customers in checking prices of products located on a store floor. Terminal 200 may be mounted on a shelf (not shown in FIG. 7b) or on column 400 or other fixed structure of the retail store. Terminal 200 may decode bar code data from bar codes on store products and transmit decoded out bar code messages to a store server for lookup of price information which is sent back from the store server to terminal 200 for display on display 230.

Figure 8:
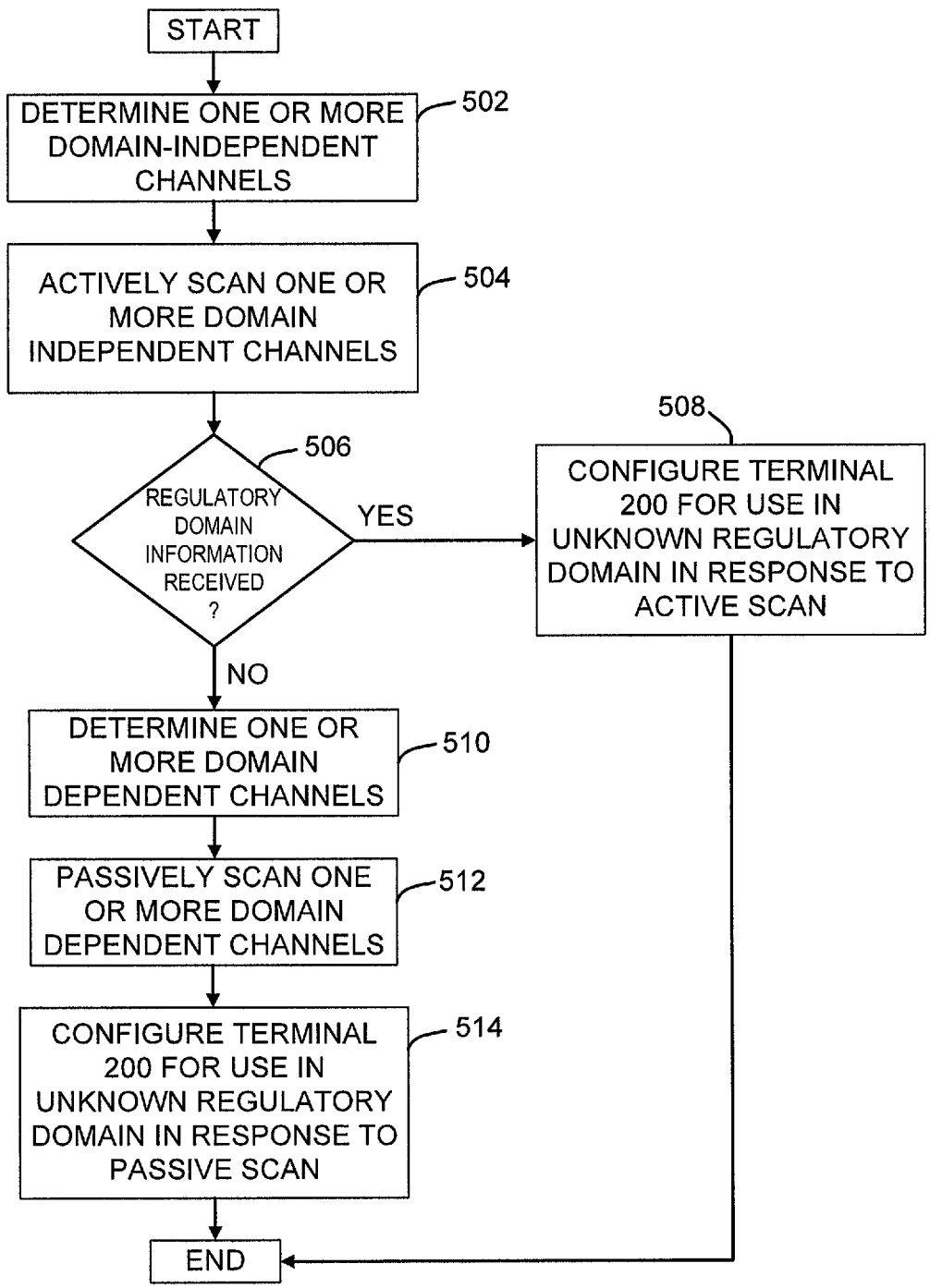
FIG. 8 is a flowchart of a method for configuring a terminal for use within an unknown regulatory domain according to an exemplary embodiment of the invention.

FIG. 8 is a flowchart of a method for configuring terminal 200 for use within an unknown regulatory domain according to one exemplary embodiment of the invention. It will be understood that each block or combination of blocks shown in FIG. 8 can be implemented by computer program instructions, e.g., of ADC program function 300, that can be stored in computer readable medium 204 and can be executed via at least one of CPU 202 and MAC/BB processor 244 of terminal 200.

At block 502, ADC program function 300 determines one or more domain independent channels. Domain independent channels are channels that are within the frequency band supported by radio 246 and that are permitted for use in each regulatory domain. For example, with reference to Table 1 set forth hereinabove, domain independent channels in the 2.4 GHz frequency band are channels 1-11. In another example, with reference to Table 2 set forth hereinabove, there are no domain independent channels in the 5 GHz frequency band. In one exemplary embodiment of the invention, at block 502, ADC program function 300 determines the domain independent channels by parsing collective regulatory domain data 208.

At block 504, ADC program function 300 directs MAC/BB processor 244 to actively scan one or more of the domain independent channels. In one exemplary embodiment of the invention, at block 502, MAC/BB processor 244 actively scans one or more of the domain independent channels by transmitting probe requests. By transmitting probe requests only over domain independent channels, there is no danger of violating the regulations of any regulatory domain.

At block 506, ADC program function 300 determines whether terminal 200 has received regulatory domain information as a result of actively scanning one or more of the domain independent channels at block 504. If terminal 200 has received regulatory domain information as a result of actively scanning one or more of the domain independent channels at block 504, processing moves to block 508, otherwise, processing moves to block 510.

At block 508, ADC program function 300 configures terminal 200 for use in the unknown regulatory domain in response to terminal 200 receiving regulatory domain information as a result of actively scanning one or more of the domain independent channels at block 504. In one exemplary embodiment of the invention, the regulatory domain information is a country information element. In another exemplary embodiment of the invention, at block 504, ADC program function 300 stores at least a portion of the regulatory domain information in computer readable medium 250. The portion of the regulatory information can be, e.g., an ISO country code contained in a country string or triplets of a country information element, or other regulatory parameters for each frequency band in which WLAN interface 242 is operable. Terminal 200, utilizing the portion of the regulatory domain information stored at block 508, can operate over channels within the legal frequency band of the regulatory domain in which terminal 200 is located. Processing ends after block 508.

At block 510, ADC program function 300 determines one or more domain dependent channels. Domain dependent channels are channels that are within the frequency band supported by radio 246 and that are not permitted for use in each regulatory domain. For example, referring again to Table 1, channels 12-14 in the 2.4 GHz frequency band are domain dependent channels, and referring again to Table 2, all channels in the 5 GHz frequency band are domain dependent channels. In one exemplary embodiment of the invention, at block 510, ADC program function 300 can determine which channels are domain dependent channels by parsing collective regulatory domain data 208.

At block 512, ADC program function 300 directs MAC/BB processor 244 to passively scan one or more domain dependent channels. In one exemplary embodiment of the invention, at block 512, ADC program function 300 passively scans one or more of the domain dependent channels by listening for beacon frames. Because no transmissions are made over the domain dependent channels at block 512, there is no danger of violating the regulations of any regulatory domain.

At block 514, ADC program function 300 configures terminal 200 for use in the unknown regulatory domain in response to passively scanning at block 512. In one exemplary embodiment of the invention, at block 514, ADC program function 300 configures terminal 200 for use in the unknown regulatory domain in response to terminal 200 receiving regulatory domain information in a beacon frame. In one exemplary embodiment of the invention, the regulatory domain information is a country information element. In another exemplary embodiment of the invention, at block 514, ADC program function 300 stores at least a portion of the regulatory domain information in computer readable medium 250. The portion of the regulatory information can be, e.g., an ISO country code contained in a country string or triplets of a country information element, or other regulatory parameters for each frequency band in which WLAN interface 242 is operable. Terminal 200, utilizing the portion of the regulatory domain information stored at block 506, can operate over channels within the legal frequency band of the regulatory domain in which terminal 200 is located.

In another exemplary embodiment of the invention, at block 514, ADC program function 300 can configure terminal 200 for use in the unknown regulatory domain in response to terminal 200 receiving, over one of the domain independent channels, a beacon frame devoid of the regulatory domain information. For example, in one exemplary embodiment, at block 514, ADC program function 300 can configure terminal 200 for use over one or more channels that are permitted for use in each of one or more regulatory domains in which the one of the domain independent channels is permitted for use. To illustrate, in response to receiving a beacon frame devoid of regulatory domain information over channel 12, ADC program function can configure terminal 200 for use over channels 1 to 13, as EMEA and Japan permit communications over channels 1 to 13, which include channel 12.

FIG. 9 depicts a simplified block diagram of a deployment system 600 suitable for deploying ADC program function 300 to terminal 200. Deployment system 600 can comprise computer system 700 and terminal 200, which can be communicatively coupled via a network 800. WLAN interface 242 of terminal 200 can provide an interface between terminal 200 and network 800. Network 800 can be, e.g., a local area network (LAN), a wide area network (WAN) such as the Internet, or any combination of LANs and WANs.

Computer system 700 can be that of a service provider and can be a workstation, server, mainframe computer, notebook or laptop computer, desktop computer, mobile phone, wireless device, set-top box, or the like. Computer system 700 can have a processor provided by central processing unit (CPU) 702, which processor can be a programmable processor for executing program instructions stored in a computer readable medium 704. The processor provided by CPU 702 can be a reduced instruction set (RISC) microprocessor such as an IBM® PowerPC® processor, an x86 compatible processor such as an Intel® Pentium® processor, an Advanced Micro Devices® Athlon® processor, or any other suitable processor. IBM and PowerPC are trademarks or registered trademarks of International Business Machines Corporation in the United States, other countries, or both. Intel and Pentium are trademarks or registered trademarks of Intel Corporation or its subsidiaries in the United States, other countries, or both. Advanced Micro Devices and Athlon are trademarks or registered trademarks of Advanced Micro Devices, Inc. or its subsidiaries in the United States, other countries, or both. In other embodiments, the processor provided by CPU 702 can be one or more processors distributed across one or more locations, e.g., on a client and server.

CPU 702 can be connected to computer readable medium 704 through a dedicated system bus 706 and/or a general system bus 708. Computer readable medium 704 can be a computer readable signal medium or a computer readable storage medium. Computer readable medium 704 can be used for storage of software instructions and configuration settings. For example, operating system 710 and ADC program function 300 can be stored in computer readable medium 704. In one embodiment, ADC program function 300 can be stored in computer readable medium 704 within an installation image. An installation image contains a copy of a computer program product to be installed, e.g., on terminal 200, in a backup format, as well as copies of other files needed to install the computer program product. The installation image can be created using, e.g., Flexera Software® InstallShield® or Microsoft Windows® Windows Installer®. Flexera Software and InstallShield are trademarks or registered trademarks of Flexera Software in the United States, other countries, or both. Windows Installer is a trademark or registered trademark of Microsoft Corporation in the United States, other countries, or both. In another embodiment, ADC program function 300 can be stored in computer readable medium 704 within a compressed file. A compressed file is a file that has been processed by a program that applies an algorithm or scheme to compress or shrink a file. A compressed file must first be uncompressed or transformed before it can be read, displayed, or used. The compressed file can be, e.g., a ZIP file or a CAB file. In another embodiment, ADC program function 300 can be stored in computer readable medium 704 in a self-extractive archive. A self-extracting archive contains a compressed file as well as program instructions to extract a file or files compressed into the compressed file.

Operating system 710 can provide functions such as device interface management, memory management, and multiple task management. Operating system 710 can be a Unix based operating system such as the IBM® AIX® operating system, a non-Unix based operating system such as an operating system falling within the Microsoft® Windows® family of operating systems, a network operating system such as Sun Microsystems® JavaOS®, or any other suitable operating system. IBM and AIX are trademarks or registered trademarks of International Business Machines Corporation in the United States, other countries, or both. Microsoft and Windows are trademarks or registered trademarks of Microsoft Corporation in the Untied States, other countries, or both. Sun Microsystems and Java and all Java-based trademarks and logos are trademarks of Sun Microsystems, Inc. in the United States, other countries, or both. CPU 702 can be suitably programmed to read, load, and execute instructions of operating system 710. Other programs (not shown) can include server software applications in which network interface 722 can interact with the server software application to enable computer system 700 to function as a network server via network 800.

General system bus 708 can support transfer of data, commands, and other information between various subsystems of computer system 700. While shown in simplified form as a single bus, general system bus 708 can be structured as multiple buses arranged in hierarchical form. Display interface 712 can support video display device 714, which can be a cathode-ray tube display or a display based upon other suitable display technology. The input/output interface 716 can support devices suited for input and output, such as keyboard or mouse device 718, and a disk drive unit (not shown).

Interface 720 can be used for operationally connecting many types of peripheral computing devices to computer system 700 via general system bus 708, such as printers, bus adapters, and other computers. Network interface 722 can provide a physical interface to network 800. Network interface 722 can be any type of adapter that provides an interface between computer system 700 and network 800, such as a modem that can be connected to a transmission system such as a telephone line, an Ethernet adapter, or a Token Ring adapter. Computer system 700 can be connected to another network server via a LAN using an appropriate network protocol and the network server that can in turn be connected to the Internet.

ADC program function 300 can be transferred from computer readable medium 704 of computer system 700 to computer readable medium 204 of terminal 200 via network 800 utilizing a transfer protocol, e.g., the File Transfer Protocol (FTP) or the Secure File Transfer Protocol (SFTP). In one embodiment, computer system 700 can function as an e-mail server, and ADC program function 300 can be transferred from computer system 700 to terminal 200 via network 800 utilizing the Simple Mail Transfer Protocol (SMTP). In another embodiment, computer system 700 can function as a web (WWW) server, and ADC program function 300 can be transferred from computer system 700 to terminal 200 via network 800 utilizing the Hypertext Transfer Protocol (HTTP) or the Hypertext Transfer Protocol Secure (HTTPS).

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A terminal for use within an unknown regulatory domain, the terminal comprising:
   one or more processors;
   one or more computer readable storage mediums;
   a wireless local area network (WLAN) interface comprising a radio, the radio being operative in a frequency band;
   first program instructions to actively scan one or more regulatory domain independent channels in the frequency band;
   second program instructions to configure the terminal for use in the unknown regulatory domain in response to the terminal receiving regulatory domain information as a result of actively scanning one or more of the regulatory domain independent channels;
   third program instructions to passively scan one or more regulatory domain dependent channels in the frequency band in response to the terminal not receiving the regulatory domain information as a result of actively scanning one or more of the regulatory domain independent channels;
   fourth program instructions to configure the terminal for use in the unknown regulatory domain in response to passively scanning one or more regulatory domain dependent channels in the frequency band;
   wherein the first, second, third, and fourth program instructions are stored on the one or more computer readable storage mediums for execution by the one or more processors.

2. The terminal of claim 1, wherein the regulatory domain information is a country information element.

3. The terminal of claim 1, wherein the WLAN interface comprises one of the one or more processors.

4. The terminal of claim 1, wherein the second program instructions include program instructions to store at least a portion of the regulatory domain information in the one or more computer readable storage mediums.

5. The terminal of claim 1, wherein the fourth program instructions include program instructions to configure the terminal for use in the unknown regulatory domain in response to the terminal receiving the regulatory domain information in a beacon frame.

6. The terminal of claim 5, wherein the fourth program instructions include program instructions to store at least a portion of the regulatory domain information in the one or more computer readable storage mediums.

7. The terminal of claim 1, wherein the fourth program instructions include program instructions to configure the terminal for use in the unknown regulatory domain in response to the terminal receiving, over one of the regulatory domain dependent channels, a beacon frame devoid of the regulatory domain information.

8. The terminal of claim 7, wherein the fourth program instructions include program instructions to configure the terminal for use over one or more channels that are permitted for use in each of one or more regulatory domains in which the one of the regulatory domain dependent channels is permitted for use.

9. The terminal of claim 1, further comprising fifth program instructions to determine the regulatory domain independent channels from collective regulatory domain data stored on the one or more computer readable storage mediums, wherein the fifth program instructions are stored on the one or more computer readable storage mediums for execution by the one or more processors.

10. The terminal of claim 1, further comprising fifth program instructions to determine the regulatory domain dependent channels from collective regulatory domain data stored on the one or more computer readable storage mediums, wherein the fifth program instructions are stored on the one or more computer readable storage mediums for execution by the one or more processors.

11. The terminal of claim 1, further comprising an encoded information reading device for outputting decoded message data corresponding to an encoded message.

12. A non-transitory computer readable medium comprising a computer program product for configuring a terminal for use within an unknown regulatory domain, the terminal comprising a wireless local area network (WLAN) interface, the WLAN interface comprising a radio operative in a frequency band, the computer program product comprising:
   first program instructions to actively scan one or more regulatory domain independent channels in the frequency band;
   second program instructions to configure the terminal for use in the unknown regulatory domain in response to the terminal receiving regulatory domain information as a result of actively scanning one or more of the regulatory domain independent channels;
   third program instructions to passively scan one or more regulatory domain dependent channels in the frequency band in response to the terminal not receiving the regulatory domain information as a result of actively scanning one or more of the regulatory domain independent channels;
   fourth program instructions to configure the terminal for use in the unknown regulatory domain in response to passively scanning one or more regulatory domain dependent channels in the frequency band;
   wherein the first, second, and third program instructions are stored on the computer readable storage medium.

13. The computer program product of claim 12, wherein the regulatory domain information is a country information element.

14. The computer program product of claim 12, wherein the second program instructions include program instructions to store at least a portion of the regulatory domain information in a second computer readable storage medium.

15. The computer program product of claim 12, wherein the fourth program instructions include program instructions to configure the terminal for use in the unknown regulatory domain in response to the terminal receiving the regulatory domain information in a beacon frame.

16. The computer program product of claim 15, wherein the fourth program instructions include program instructions to store at least a portion of the regulatory domain information in a second computer readable storage medium.

17. The computer program product of claim 12, wherein the fourth program instructions include program instructions to configure the terminal for use in the unknown regulatory domain in response to the terminal receiving, over one of the regulatory domain dependent channels, a beacon frame devoid of the regulatory domain information.

18. The computer program product of claim 17, wherein the fourth program instructions include program instructions to configure the terminal for use over one or more channels that are permitted for use in each of one or more regulatory domains in which the one of the regulatory domain dependent channels is permitted for use.

19. The computer program product of claim 12, further comprising fifth program instructions to determine the regulatory domain independent channels from collective regulatory domain data, wherein the fifth program instructions are stored on the computer readable storage medium.

20. The computer program product of claim 12, further comprising fifth program instructions to determine the regulatory domain dependent channels from collective regulatory domain data, wherein the fifth program instructions are stored on the computer readable storage medium.

21. The computer program product of claim 12, wherein the computer program product is provided on a computer system for deployment to a terminal.

22. A method for configuring a terminal for use in an unknown regulatory domain, the method performed by execution of computer-readable program code by one or more processors of a terminal, the method comprising:

(a) passively scanning, using the one or more processors, one or more regulatory domain dependent channels in a frequency band;

(b) configuring, using the one or more processors, the terminal for use in the unknown regulatory domain in response to the terminal receiving a beacon frame comprising regulatory domain information; and (c) configuring, using the one or more processors, the terminal for use in the unknown regulatory domain in response to the terminal receiving, over one of the regulatory domain dependent channels, a beacon frame devoid of the regulatory domain information.

23. The method of claim 22, wherein the regulatory domain information is a country information element.

24. The method of claim 22, wherein the configuring step (c) further comprises configuring, using the one or more processors, the terminal for use over one or more channels that are permitted for use in each of one or more regulatory domains in which the one of the regulatory domain dependent channels is permitted for use.

* * * * *